Feb. 8, 1927.

E. BROWN

GREASE GUN FILLER

Filed May 13, 1926    3 Sheets-Sheet 1

1,616,780

INVENTOR
Everett Brown.
BY Milton E. Lowry
ATTORNEY

Feb. 8, 1927. 1,616,780
E. BROWN
GREASE GUN FILLER
Filed May 13, 1926  3 Sheets-Sheet 2

INVENTOR
Everett Brown.
BY Milton E. Lowry
ATTORNEY

Feb. 8, 1927.

E. BROWN

GREASE GUN FILLER

Filed May 13, 1926     3 Sheets-Sheet 3

1,616,780

INVENTOR
Everett Brown.
BY Milton E. Lowry
ATTORNEY

Patented Feb. 8, 1927.

1,616,780

UNITED STATES PATENT OFFICE.

EVERETT BROWN, OF HARDY, KENTUCKY.

GREASE-GUN FILLER.

Application filed May 13, 1926. Serial No. 108,926.

This invention relates to certain new and useful improvements in grease gun fillers and has for its primary object to provide a grease receptacle of a size and form that may be supported upon a wall of an automobile body beneath the cowl and in proximity of the engine of the automobile whereby the grease may be kept in the proper fluent condition to be delivered through a grease gun.

A further object of the invention is to provide a grease gun filler of the type above set forth wherein the receptacle for containing the grease has a filling opening at its upper end and a discharge opening at its lower end, a valved air vent associated with the cover for the filling opening automatically operating to permit a free discharge of grease through the outlet at the lower end.

A still further object of the invention is to provide an automatically operating valve closure for the lower outlet end of the grease receptacle that operates to permit a complete charge to be delivered into the grease gun and to close automatically when the grease gun is disengaged from the grease receptacle.

With the above and other objects in view that will become apparent as the nature of the invention is better understood, that same consists of the novel form, combination and arrangement of parts hereinafter more fully described, shown in the accompanying drawing and claimed.

Figure 1:
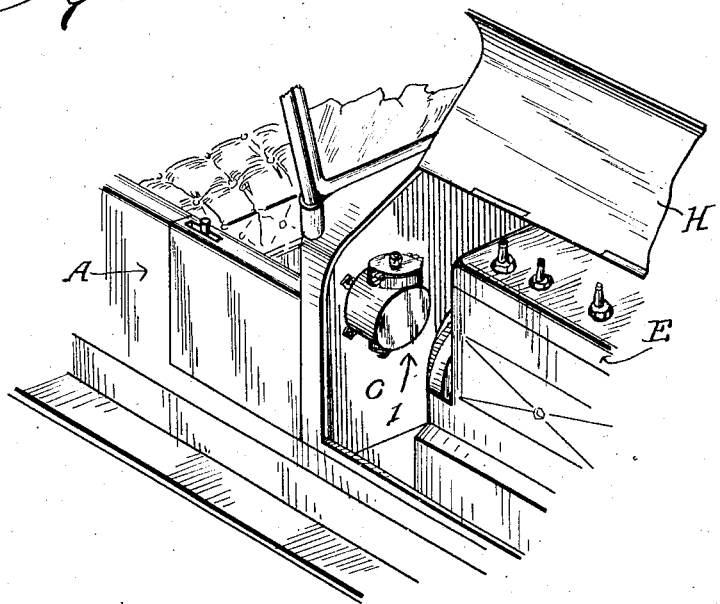
Figure 2:
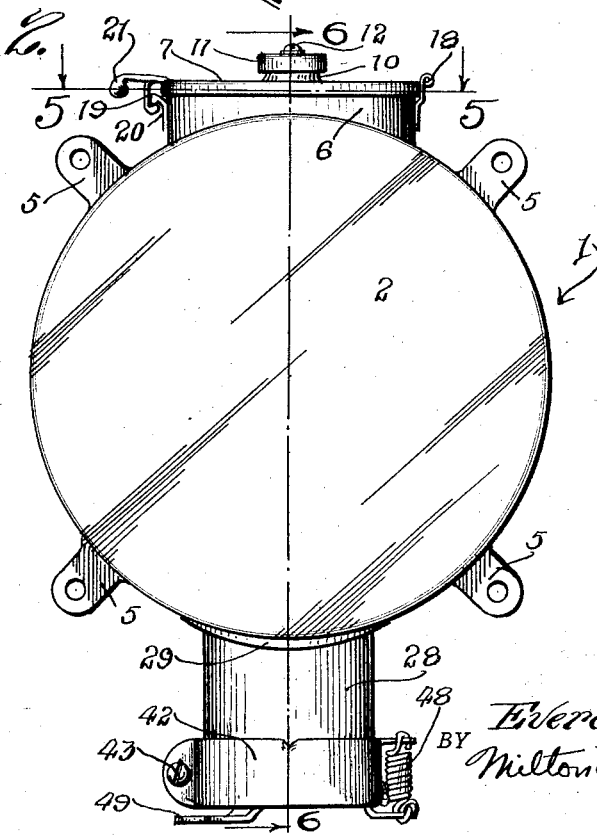
Figure 3:
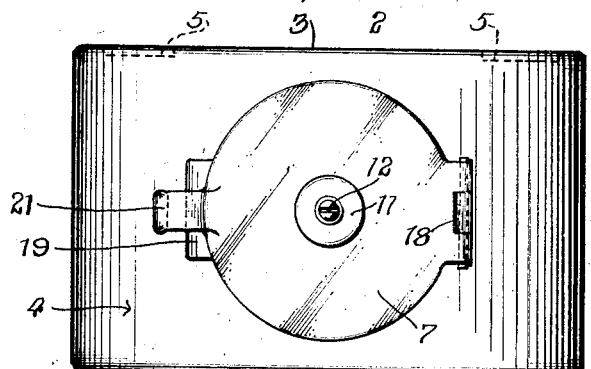
Figure 4:
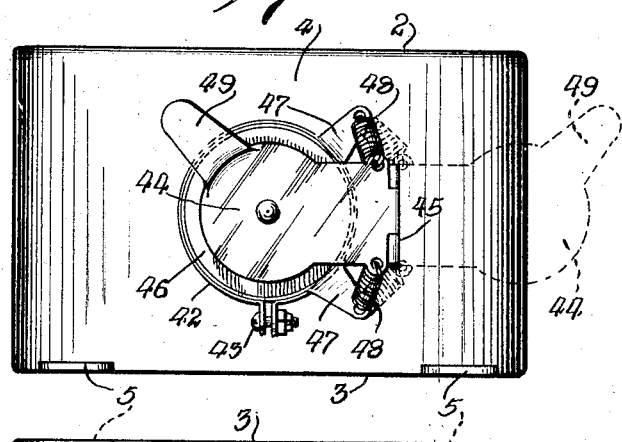
Figure 5:
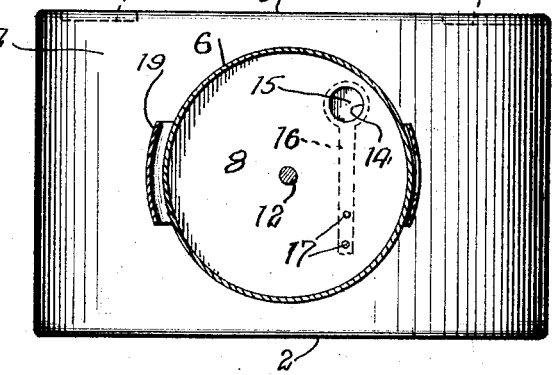
Figure 6:
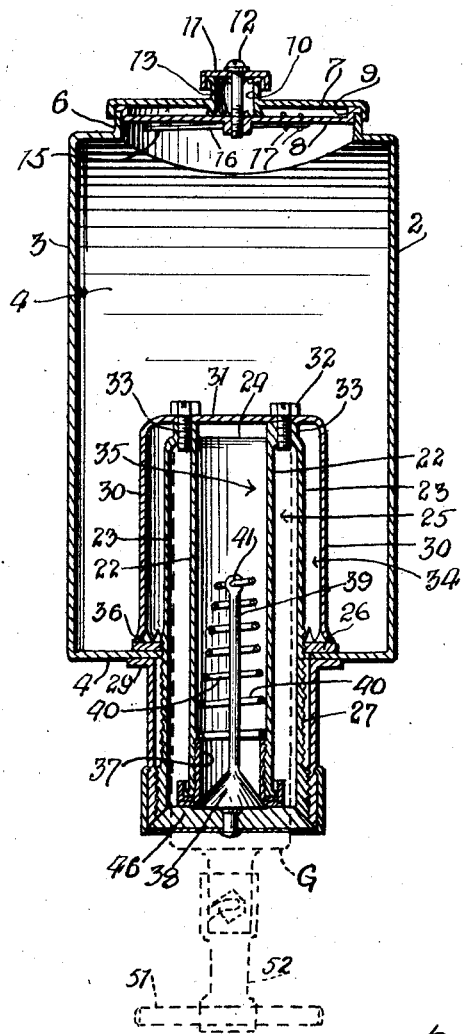
Figure 7:
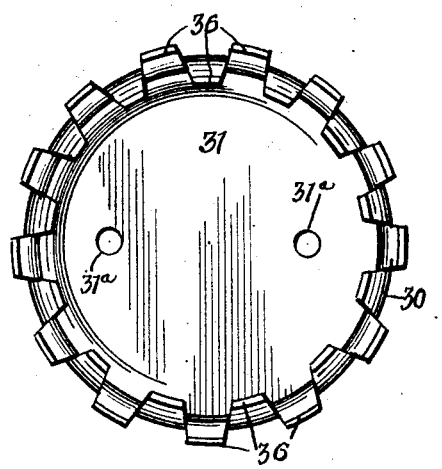
Figure 8:
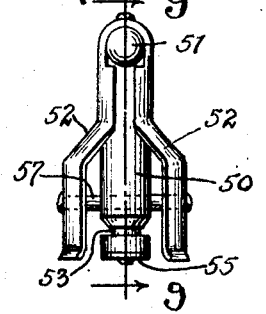
Figure 9:
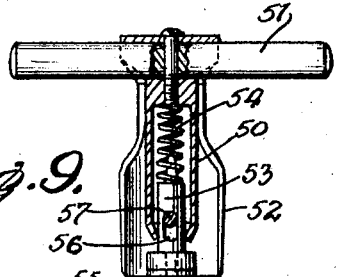

In the drawings, wherein like reference characters designate corresponding parts throughout the several views, Figure 1 is a fragmentary perspective view of an automobile with one side of the engine hood elevated to show the grease gun filling receptacle supported upon the cowl wall, Figure 2 is a front elevational view of the grease receptacle, Figure 3 is a top plan view of the same, Figure 4 is a bottom plan view with the closure plate for the outlet opening shown in its open position by dotted lines, Figure 5 is a horizontal sectional view taken on line 5—5 Figure 2 showing the valve controlled air vent in the closure cap for the receptacle, Figure 6 is a vertical cross sectional view taken on line 6—6 of Figure 2 showing a grease gun by dotted lines in position within the grease receptacle and ready to be withdrawn therefrom and automatically filled with grease, Figure 7 is a top plan view of a compartment wall removed from the grease receptacle, Figure 8 is a side elevational view of the valve structure for closing the discharge orifice in the grease gun when the latter is being filled, and Figure 9 is a vertical cross-sectional view taken on line 9—9 of Figure 8.

An important object of this invention is to provide a grease receptacle that can be conveniently carried by an automobile and in a position for ready access to permit filling of a grease gun without the necessity of removing the grease receptacle from its support on the automobile and further to position a receptacle with respect to the engine so that the heat will maintain the grease in proper condition to be easily discharged from the receptacle. As shown in Figure 1, the grease receptacle designated by the reference numeral 1 is supported upon the cowl C of the automobile A in proximity of the engine E and beneath the hood H, it being understood that the grease receptacle is to be mounted upon the cowl at the side of the engine E opposite the mounting of the usual vacuum tank.

The grease receptacle is preferably constructed of the design illustrated and comprises front and rear walls 2 and 3 connected by an annular side wall 4, lugs 5 projecting outwardly of the rear wall 3 in the same plane thereof being provided with openings as shown in Fig. 2 for the passage of anchoring screws or other fastening means that enter the cowl C.

As shown more clearly in Figures 3 and 6, the upper side of the annular side wall 4 is provided with a filling opening neck 6 with which a cover is associated. The cover comprises upper and lower spaced walls 7 and 8 and are so retained by the annular flange 9 carried by the cover wall 8 being directed toward the cover wall 7 adjacent its peripheral edge while a central opening formed in the wall section 7 and being surrounded by a tubular boss 10 projecting at opposite sides thereof with one end of the tubular boss directed toward and engaging the cover section 8 at its center, this construction being clearly shown in Fig. 6. A cap 11 overlies the outer end of the tubular boss 10 and a screw 12 passing centrally through the cap and the wall section 8 secures the two cover wall sections 7 and 8 together. The air space between the cover wall sections 7 and 8 communicates with the atmosphere by the provision of serrated edges 13 at each end of the tubular boss 10. The air space between the cover wall sections is also placed in communication with the interior of the grease receptacle 1 by the provision of the opening 14 formed in the wall section 8 that is normally closed by the flap valve 15 carried by the spring arm 16 which is secured as at 17 to the lower side of the cover wall section 8. As shown in Figures 2 and 3, the cover for the filling opening is hinged at one side as at 18 to the filling neck 6 while a spring finger 19 carried by the other side of the cover is moved into engagement with the keeper 20, a finger piece 21 carried by the free swinging side edge of the cover facilitates opening and closing movements thereof.

A valve controlled discharge opening for the grease is formed in the lower side of the annular side wall 4 beneath the filling opening and the devices associated with the discharge opening are shown more clearly in Fig. 6. A double wall member comprising spaced inner and outer walls 22 and 23 respectively connected together at their upper ends as at 24 with the lower ends thereof remaining open to provide a passage with the space between the walls designated by the numeral 25, is positioned in the discharge opening at the lower side of the grease receptacle with the closed end 24 thereof disposed inwardly of the receptacle, the double walled casting being retained in the receptacle by the internally threaded screw ring 26 engaging external threads 27 upon the outer wall 23 with the ring 26 resting upon the annular wall 4 surrounding the discharge opening. The connection between the double walled casting and the wall of the grease receptacle is rendered leak proof by the provision of the sleeve 28 inclosing the outwardly projecting end of the casting and internally threaded at its lower end as shown in Fig. 6 for threaded engagement with the external threads upon the outer wall 23 while the annular flange 29 upon the upper end of the sleeve is moved into binding engagement with the outer face of the annular wall 4 of the grease receptacle whereby the double walled casting is rigidly supported in position. A hood is associated with the inner end of the double walled casting and includes a cylindrical wall 30 having a closed upper end 31 overlying the casting and secured thereto by the screw studs 32 passing through openings formed in and engaging faces 33 carried by the upper closed end 24 of the casting to form communication between the chamber 34 that spaces walls 23 and 30 and the central passage 35 through the casting. In Fig. 7, the upper wall 31 of the hood shows the openings 31ª through which the screw studs 32 extend. To form communication between the interior of the receptacle 1 and the chamber 34, the lower annular edge of the side wall 30 of the hood is serrated to provide tapering fingers 36, adjacent ones of the which extend in opposite directions from the plane of the side wall of the hood and engaging the ring 26 providing a plurality of orifices for the passage of grease from the receptacle 1 into the chamber 34 and central passage 35 of the double walled casting.

As the grease in the receptacle 1 is discharged through the central passage 35 in the double walled casting, a valve is associated with the lower open end of the passage, the inner face of the inner wall 22 of the casting at its lower end being internally threaded for the reception of the removable tubular valve seat 37 and with which seat the conical valve 38 is associated as shown in Fig. 6. The valve 38 carries a relatively long stem 39 at its apex while a coil spring 40 surrounding the valve stem is anchored at one of its ends as at 41 to the upper end of the valve stem 39 while the other end of the spring 40 engages the upper inner end of the tubular valve seat 37 and as will be understood, the power of the spring normally exerts a pressure to hold the valve 38 upon its seat.

A closure cap is provided for the discharge end of the grease receptacle and includes a band 42 placed in inclosing relation with the lower end of the tubular clamp 28 with the split ends of the band secured together as at 43, the closure plate 44 having an offset hinge connection 45 with the band 42 carrying a leather stopper 46 that overlies the valve 38, closes the lower end of the chamber 25 and engages the lower ends of the outer wall 23 of the casting and the tubular member 28. A pair of lugs 47 carried by the band 42 has coil spring connections 48 with the offset hinge connection 45 as shown in Fig. 4, the cover plate 44 being opened and closed by the finger piece 49. When the cover 44 is in a closed position illustrated by full lines in Fig. 4, the same is so retained by the springs 48, while the cover is similarly retained in an open position as illustrated by dotted lines by the force or pull of the springs being positioned at the opposite side of the hinge mounting 45 as shown by dotted lines.

The grease receptacle being disposed in proximity of the automobile engine E as shown in Fig. 1, the grease contained therein is in a semi-fluid condition due to heat radiating from the engine and is permitted to move from the main chamber in the receptacle 1 between the bent fingers 36 at the lower edge of the hood 30 to enter the chamber 34 and be received in the central passage 35 of the double walled casting by flowing through the space between the wall 31 of the hood 30 and the upper end 24 of the double wall casting. In filling the grease gun G as illustrated by dotted lines in Fig. 6, the usual pump piston is removed from the filling end of the gun while the device shown in Figs. 8 and 9 is attached thereto the discharge nozzle of the gun to close the grease issuing orifice therein. The stopper 50 having the cross handle 51 at one end thereof and inclosed by the spaced guard arms 52 houses the sliding pin 53 that is spring pressed as at 54 with a valve stopper 55 at its outer end. The pin 53 is longitudinally slotted as at 56 while the cross pin 57 extending through said slot and anchored at its ends in the guard arms 52 in its outward movement of the pin 53 under influence of the spring 54 and also cooperates with the usual bayonet slot in the discharge nozzle of the grease gun. The device shown in Figs. 8 and 9 is illustrated upon the discharge nozzle of the grease gun by dotted lines in Fig. 6 to close the discharge opening in the nozzle. When the closure plate 44 for the discharge opening at the lower end of the grease receptacle is open, the filling end of the grease gun G is moved upwardly into the chamber 25 between the inner and outer walls 22 and 23 of the double walled casting and when withdrawn therefrom, a suction is created in the central passage 35, chamber 34 and the main chamber in the receptacle 1 that causes opening movement of the valve 38 against the tension of the spring 40 to draw the grease into the central passage 35 and interior of the grease gun G during withdrawal movement thereof from the casting. The vent opening 14 in the lower wall section 8 of the filling opening cover permitting the entrance of air into the main chamber of the receptacle and the natural discharge of grease through the central passage 35. When the grease gun is completely removed in a filled condition from the receptacle, the spring 40 automatically closes the valve 38 while the closure plate 44 effectively seals the discharge opening of the receptacle to prevent the escape of grease and the entrance of dust or other foreign matter. The double walled cover for the filling neck of the receptacle with its valved vent prevents the entrance of dust into the receptacle at its upper end while air is permitted to enter the space between the cover wall section for passage through the vent opening 14. As above stated, the grease receptacle may be carried by any convenient part of the automobile, but is preferably located on the cowl C in proximity of the engine E and at the side of the engine opposite the usual vacuum tank and in such position, the grease contained therein is maintained in a semifluid condition for ready discharge into a grease gun G when positioned in the chamber 25 as herein described. If desired, the cover section of the filling opening for the receptacle may be carried by a band, similar to the outlet closure band 42, so that the cover section may swing from either side of the receptacle.

From the above detailed description of the device, it is believed that the construction and operation thereof will at once be apparent, and while there is herein shown and described the preferred embodiment of the present invention, it is nevertheless to be understood that minor changes may be made therein without departing from the spirit and scope of the invention as claimed.

What is claimed as new is:

1. As a means for charging grease guns, wherein the gun includes a barrel and a removable plunger active in discharging the grease from the gun, a receptacle for grease in bulk, a charge delivery instrumentality carried by the receptacle, said instrumentality including a normally closed grease delivery port, means whereby the gun barrel may be positioned relative to such port to permit the barrel to produce suction activity through the port by movement of the barrel relative to the port walls in withdrawing the barrel from its position, said delivery port being opened by and during such suction activity, and means for venting the receptacle during the period of such suction activity.

2. As a means for charging grease guns, wherein the gun includes a barrel and a removable plunger active in discharging the grease from the gun, a receptacle for grease in bulk, a charge delivery instrumentality carried by the receptacle, said instrumentality including a normally closed grease delivery port, means whereby the gun barrel may be positioned relative to such port to permit the barrel to produce suction activity through the port by movement of the barrel relative to the port walls in withdrawing the barrel from its position, means for venting the receptacle during the period of such suction activity, and said instrumentality comprising an open-ended double-wall formation with the walls spaced apart to provide a chamber to receive the barrel of the grease gun.

3. As a means for charging grease guns, wherein the gun includes a barrel and a removable plunger active in discharging the grease from the gun, a receptacle for grease in bulk, a charge delivery instrumentality carried by the receptacle, said instrumentality including a normally closed grease delivery port, means whereby the gun barrel may be positioned relative to such port to permit the barrel to produce suction activity through the port by movement of the barrel relative to the port walls in withdrawing the barrel from its position, means for venting the receptacle during the period of such suction activity, and said instrumentality comprising an open-ended double-wall formation with the walls spaced apart to provide a chamber to receive the barrel of the grease gun, the inner wall forming a channel for the grease charge during travel of the latter to the delivery port.

4. As a means for charging grease guns, wherein the gun includes a barrel and a removable plunger active in discharging the grease from the gun, a receptacle for grease in bulk, a charge delivery instrumentality carried by the receptacle, said instrumentality including a normally closed grease delivery port, means whereby the gun barrel may be positioned relative to such port to permit the barrel to produce suction activity through the port by movement of the barrel relative to the port walls in withdrawing the barrel from its position, means for venting the receptacle during the period of such suction activity, and said instrumentality comprising an open-ended double-wall formation with the walls spaced apart to provide a chamber to receive the barrel of the grease gun, the inner wall forming a channel for the grease charge during travel of the latter to the delivery port, and a valve located at such delivery port, said valve being active to normally maintain the port closed, and shiftable by the suction activity of the gun barrel movement, for opening the port to permit discharge of the grease into the barrel.

5. As a means for charging grease guns, wherein the gun includes a barrel and a removable plunger active in discharging the grease from the gun, a receptacle for grease in bulk, a charge delivery instrumentality carried by the receptacle, said instrumentality including a normally closed grease delivery port, means whereby the gun barrel may be positioned relative to such port to permit the barrel to produce suction activity through the port by movement of the barrel relative to the port walls in withdrawing the barrel from its position, means for venting the receptacle during the period of such suction activity, and said instrumentality comprising an open-ended double-wall formation with the walls spaced apart to provide a chamber to receive the barrel of the grease gun, the inner wall forming a channel for the grease charge during travel of the latter to the delivery port, and a valve located at such delivery port, said valve being active to normally maintain the port closed, and shiftable by the suction activity of the gun barrel movement, for opening the port to permit discharge of the grease into the barrel, the position of the valve being such that the valve is adjacent the bottom of the barrel at the beginning of suction activity, whereby the charge is delivered progressively from the bottom of the barrel toward the open end of the latter during the withdrawal movement of the barrel.

6. Means for filling a grease gun, including a grease receptacle, charge delivery means carried by the receptacle, a tensioned valve closure for the delivery means, and said delivery means adapted to have a grease gun barrel positioned therein and in inclosing relation to the tensioned valve to create suction in the barrel when the same is moved outwardly of the delivery means to open the valve and cause the flow of grease into the barrel.

7. Means for filling a grease gun, including a grease receptacle, charge delivery means carried by the receptacle, a tensioned valve closure for the delivery means, and said delivery means being constructed whereby a grease gun barrel positioned in said delivery means causes suction therein when the barrel is moved outwardly thereof to open the valve and cause the flow of grease into the barrel, and a vented closure for the receptacle.

8. Means for filling a grease gun, including a grease receptacle, charge delivery means carried by the receptacle, a tensioned valve closure for the delivery means, and said delivery means being constructed whereby a grease gun barrel positioned in said delivery means causes suction therein when the barrel is moved outwardly thereof to open the valve and cause the flow of grease into the barrel, said delivery means including a double walled member having a central passage with the space between the walls closed at their upper ends and said grease gun barrel being received between the walls.

9. Means for filling a grease gun, including a grease receptacle, charge delivery means carried by the receptacle, a tensioned valve closure for the delivery means, and said delivery means being constructed whereby a grease gun barrel positioned in said delivery means causes suction therein when the barrel is moved outwardly thereof to open the valve and cause the flow of grease into the barrel, said delivery means including a double walled member having a central passage with the space between the walls closed at their upper ends and said grease gun barrel being received between the walls, and a hood overlying the double walled member and spaced therefrom.

10. Means for filling a grease gun, including a grease receptacle, charge delivery means carried by the receptacle, a tensioned valve closure for the delivery means, and said delivery means being constructed whereby a grease gun barrel positioned in said delivery means causes suction therein when the barrel is moved outwardly thereof to open the valve and cause the flow of grease into the barrel, said delivery means including a double walled member having a central passage with the space between the walls closed at their upper ends and said grease gun barrel being received between the walls, and a hood overlying the double walled member and spaced therefrom, with one end of the hood serrated and engaging the adjacent wall of the receptacle and permitting the flow of grease from the receptacle into the double walled member.

11. Means for filling a grease gun, including a grease receptacle, charge delivery means carried by the receptacle, a tensioned valve closure for the delivery means, and said delivery means being constructed whereby a grease gun barrel positioned in said delivery means causes suction therein when the barrel is moved outwardly thereof to open the valve and cause the flow of grease into the barrel, said delivery means including a double walled member having a central passage with the space between the walls closed at their upper ends and said grease gun barrel being received between the walls, and means associated with the discharge nozzle of the grease gun during charging thereof to close the grease port in the discharge nozzle whereby suction may be created during withdrawal of the barrel from the double walled member.

12. Means for filling a grease gun, including a grease receptacle, charge delivery means carried by the receptacle, a tensioned valve closure for the delivery means, and said delivery means being constructed whereby a grease gun barrel positioned in said delivery means causes suction therein when the barrel is moved outwardly thereof to open the valve and cause the flow of grease into the barrel, said delivery means including a double walled member having a central passage with the space between the walls closed at their upper ends and said grease gun barrel being received between the walls, and a hood overlying the double walled member and spaced therefrom, and means associated with the discharge nozzle of the grease gun during charging thereof to close the grease port in the discharge nozzle whereby suction may be created during withdrawal of the barrel from the double walled member.

13. Means for filling a grease gun, including a grease receptacle, charge delivery means carried by the receptacle, a tensioned valve closure for the delivery means, and said delivery means being constructed whereby a grease gun barrel positioned in said delivery means causes suction therein when the barrel is moved outwardly thereof to open the valve and cause the flow of grease into the barrel, said delivery means including a double walled member having a central passage with the space between the walls closed at their upper ends and said grease gun barrel being received between the walls, and a hood overlying the double walled member and spaced therefrom, with one end of the hood serrated and engaging the adjacent wall of the receptacle and permitting the flow of grease from the receptacle into the double walled member, and means associated with the discharge nozzle of the grease gun during charging thereof to close the grease port in the discharge nozzle whereby suction may be created during withdrawal of the barrel from the double walled member.

14. Means for filling a grease gun, including a grease receptacle, charge delivery means carried by the receptacle, a tensioned valve closure for the delivery means, and said delivery means being constructed whereby a grease gun barrel positioned in said delivery means causes suction therein when the barrel is moved outwardly thereof to open the valve and cause the flow of grease into the barrel, said delivery means including a double walled member having a central passage with the space between the walls closed at their upper ends and said grease gun barrel being received between the walls, and a hood overlying the double walled member and spaced therefrom, with one end of the hood serrated and engaging the adjacent wall of the receptacle and permitting the flow of grease from the receptacle into the double walled member, and a closure cap for the outer end of the delivery means.

In testimony whereof I affix my signature.

EVERETT BROWN.